United States Patent [19]

Haga et al.

[11] 4,282,093
[45] Aug. 4, 1981

[54] APPARATUS FOR DETECTING COAGULATION EFFECT

[75] Inventors: Teturo Haga; Takashi Ikeguchi, both of Hitachi, Japan

[73] Assignee: Hitachi, Ltd., Tokyo, Japan

[21] Appl. No.: 55,464

[22] Filed: Jul. 6, 1979

[30] Foreign Application Priority Data

Jul. 5, 1978 [JP] Japan .................................. 53-81006

[51] Int. Cl.³ .......................... B01D 21/01; C02F 1/52
[52] U.S. Cl. ...................................... 210/90; 210/101; 210/143; 210/709; 364/500
[58] Field of Search .......................... 210/42 R, 51-54, 210/90, 97, 101, 102, 141-143, 702, 709, 729; 364/500, 558

[56] References Cited
U.S. PATENT DOCUMENTS

| | | | |
|---|---|---|---|
| 2,858,024 | 10/1958 | Babcock | 210/143 |
| 3,262,878 | 7/1966 | Beckley et al. | 210/53 |
| 3,542,674 | 11/1970 | Machlan | 210/42 R |
| 3,725,263 | 4/1973 | Harris et al. | 210/42 R |
| 4,151,086 | 4/1979 | Brooks | 210/142 |

*Primary Examiner*—Peter A. Hruskoci
*Attorney, Agent, or Firm*—Craig and Antonelli

[57] ABSTRACT

In a water purification plant, where a coagulant is dosed into raw water to coagulate turbidity-causing particles suspended in the raw water to form floc, and the water containing the floc is led to a sedimentation basin to separate the floc by sedimentation, thereby purifying the raw water, a coagulation effect is quickly detected by by-passing a portion of the water containing the floc and flowing to the sedimentation basin through a filter column of an apparatus for detecting a coagulation effect, the filter column being filled with a filter layer of filter medium, detecting a filtration pressure at the column side at a specific level of the filter layer at a specific time interval, monitoring a change in a rate of change in the filtration pressures to detect an improper dosage of the coagulant in correlation to the change in the rate of change in the filtration pressure, and outputting an alarm signal to a coagulant dosage control system, when the detected coagulation effect is detected improper.

10 Claims, 9 Drawing Figures

APPARATUS FOR DETECTING COAGULATION EFFECT

This invention relates to an apparatus for detecting a coagulation effect, which is suitably applicable to the control of purification process in water purification plants, etc.

In order to improve the quality of raw water taken from river, pond, etc. to make water suitable for end consumption, various water treatments are carried out in a water purification plant. For example, soluble iron, manganese, etc. in raw water are oxidized by chlorine injection (chlorination) to insoluble iron, manganese, etc., and then are removed by sedimentation. Among turbidity-causing particles suspended in raw water (which will be hereinafter referred to as "suspended particles"), suspended inorganic particles, for example, fine particles of fine sand, clay, etc. having diameters of less than 0.1 mm, are coagulated by dosing of a coagulant, and then removed by sedimentation. Organic suspended particles, for example, plankton and various microorganisms are killed by said chlorination, and coagulated as suspended fine particles by said dosing of the coagulant, and removed by sedimentation.

Furthermore, in order to improve the effect of the coagulant by adjusting pH and alkalinity of raw water, an alkali dosing is carried out. That is, dosing of chemicals such as chlorine, coagulant, and alkali is carried out in almost every water purification plant.

The coagulant is dosed into the raw water in a mixing tank after the raw water has been subjected to chlorination and alkali dosing, and the suspended particles in the raw water are coagulated to fine floc by mixing and stirring. The suspended particles are mainly comprised of hydrophobic colloidal particles, and are mostly negatively charged. In order to coagulate these hydrophobic colloidal particles to floc, the attractive force must be made larger than the repulsive force between the particles, but the repulsive force is large in the normal state between the negatively charged colloidal particles of the same charge, and the particles are always kept away from each other, even if they approach each other by a Brownian movement or by a change in flow due to the occurrence of small eddies.

A coagulant is cationic and can lower the surface potential (zeta potential) of the negatively charged colloidal particles, and works as a positively charged colloid by itself to undergo mutual coagulation with the negatively charged colloidal particles and form fine floc.

The resulting fine floc suspended in the water is led to a flocculation basin, where the fine floc is made to grow larger. Then, the grown floc is separated from the water by sedimentation in a sedimentation basin. The supernatant water from the sedimentation basin is led to a filtration tank, where fine floc which has not been separated by sedimentation in the sedimentation basin, is filtered off. The filtered water is then distributed to each consumption end through a purified water reservoir, a purified water service reservoir, etc.

In the water purification process in a water purification plant, the coagulation and sedimentation treatment of suspended particles by a coagulant and the filtration treatment in a filtration tank play important roles, and particularly the coagulation and sedimentation treatment is, however, more important.

In the coagulation and sedimentation treatment, a coagulant dosage is generally determined according to experiences in view of the measured values of turbidity, pH and alkalinity of raw water. However, even if the turbidity, pH and alkalinity of raw water are constant, the quality of water is greatly influenced also by climatic conditions, for example, whether a fine weather or a rainy weather prevails. Even if the turbidity is constant, particle sizes of suspended particles make a difference in a rainy weather. Thus, even if a coagulant dosage is determined on the basis of measurement results of turbidity, pH and alkalinity of raw water, a dosage will be higher or lower than the proper coagulant dosage, whenever the quality of water is changed by the climatic condition. As a result, whenever the coagulant dosage is higher or lower than the proper dosage, the repulsive force will be larger than the attractive force between the suspended particles, and thus the floc formation effect will be lowered. In that case, no large floc of a good settling ability can be formed, and the amount of suspended fine particles and fine floc is increased in the sedimentation basin. That is, these suspended fine particles and fine floc must be inevitably filtered off in the filtration tank, and a load of the filtration tank is increased. Such inconveniences as clogging of filter sand and consequent increase in number of back washing runs of the filter sand are brought about. Thus, it is necessary to judge the coagulation effect of a coagulant as quickly as possible after the dosing of a coagulant, because a turbidity of supernatant water from the sedimentation basin must be presumed from the result of the judgement and also it must be judged therefrom whether the coagulant dosage is kept to a proper dosage or not.

That is, a control of chemical dosage in the water purification plant is important in conversion of raw water to sanitarily safe water of stabilized quality and obtaining potable water of good quality, and nowadays it has been most popular to effectively carry out the chemical dosage control by introducing a computer control into it. Thus, it is quite necessary for the computer control of chemical dosage in a water purification plant to detect a coagulation effect of the dosed coagulant to control the coagulant dosage to a proper one and obtain a good coagulation effect.

A good coagulation effect is in correlation to the size of floc, and a method for presuming the sizes of floc by way of a turbidity of supernatant effluent water from the sedimentation basin is known from Japanese Laid-open Patent Application No. 93160/77, where, on the basis of the measurement results of turbidity of the supernatant effluent water from the sedimentation basin, it is equivalently judged that larger floc is formed when the turbidity is low, whereas small floc is formed when the turbidity is high. However, there is a time lag corresponding to a sum total of residence time in the respective tanks and basins, for example, 4 to 5 hours, until the turbidity of the supernatant effluent water from the sedimentation basin is found after the dosing of a coagulant. Thus, even if the turbidity is found larger due to some failure in the treatment, it is difficult to conduct a feedback control to adjust the coagulant dosage to a proper one on the basis of the found turbidity, and consequently a load upon the sedimentation basin will be increased.

Another process is known for judging the coagulation effect by providing an industrial purpose television in the water of the sedimentation basin and visually observing the sizes of floc. However, the television is seriously fouled and frequent maintenance is required for the television. Thus, the method is not suitable for water purification plants requiring a considerable power saving.

As a result of extensive studies of a means for detecting a coagulation effect of the dosed coagulant as quickly as possible in view of the background situations of the prior art, the present inventors have found that, as shown in the following Experimental Example, a coagulation effect of dosed coagulant can be detected by monitoring a rate of change in pressure during filtration, that is, a water head loss rate, when water containing floc formed by dosing a coagulant, and a coagulant dosage, if detected improper, can be made proper by feeding the detected result back to a control system of coagulant dosage.

Experimental Example on which the present invention is based will be described, referring to the accompanying drawings.

EXPERIMENTAL EXAMPLE

A filter column, 7 cm in diameter and 2 m high, was used, and glass beads, 0.5 mm in average particle diameter, as a filter medium were filled up to a height of 95 cm from the bottom in the filter column. Raw water was artificially prepared by suspending purified kaolin as suspended particles in potable water at predetermined turbidities. Polyaluminum chloride (PAC) was used as a coagulant, and experiments were carried out for stationary states where the coagulant dosage was gradually changed from an improper one to a proper one, and for transient states where the turbidity of raw water and the coagulant dosage were changed under the following conditions. Manometers were fixed to the side wall of the filter column at equal vertical distances of 5 cm.

Before conducting experiments, potable water was passed through the filter column at a predetermined filtration rate, and when a proper water head loss of the filter medium was reached, the coagulant was dosed into the raw water containing kaolin to form floc, and the water containing the resulting floc was passed through the filter column from its top at a flow rate of 3 l/min, and water head loss rates as a rate of change in filtration pressure were measured together with coagulant dosage and filtration time. Furthermore, relations between the water head loss rate and turbidity of supernatant water and relations between the water head loss rate and filtration time were obtained from the measured values.

Appropriateness of the coagulant dosage was determined by jar test.

The time when the water containing the floc was led into the filter medium was made zero minute of the filtration time, and measurement was made at a time interval of 3 minutes for 30 minutes. The turbidity of supernatant water was determined by sampling a portion of the water containing the floc to be led to the filter column into a beaker 30 minutes after the start of filtration through the filter column, and measuring the turbidity of supernatant water of the sample 20 minutes after leaving the beaker standing.

Figure 1:
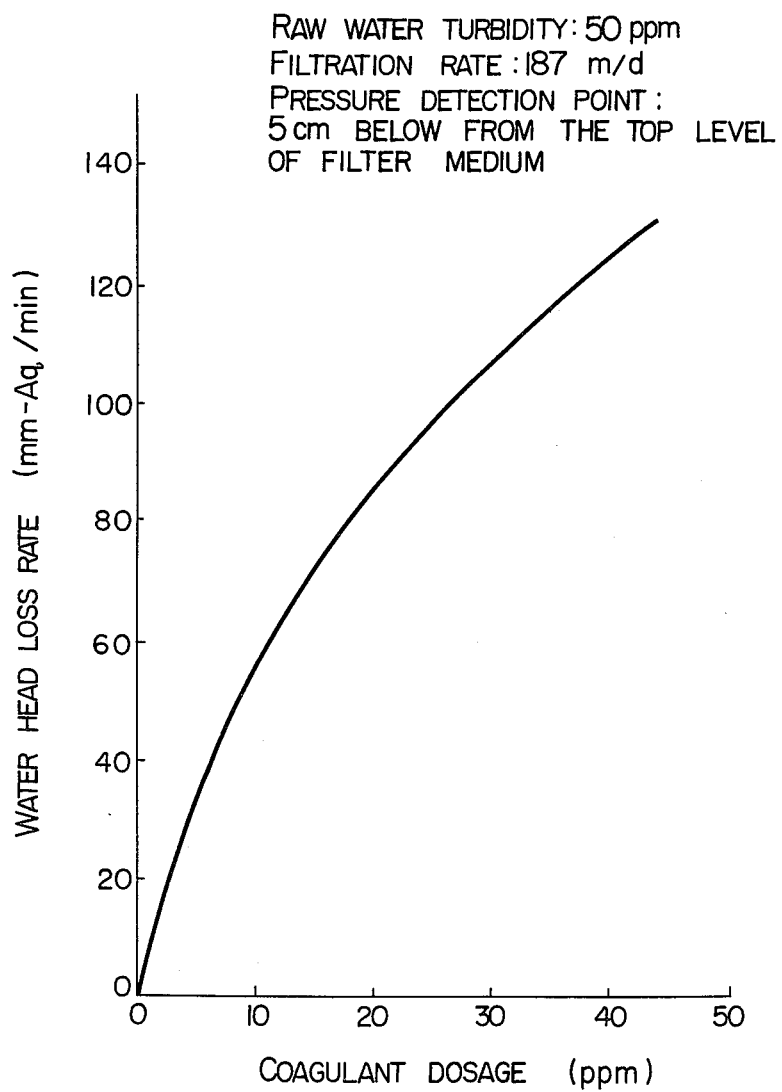
FIG. 1 is a diagram showing relations between coagulant dosage and water head loss rate as a rate of change in filtration pressure.

It was found that the coagulant dosage and the water head loss rate as a rate of change in filtration pressure are in such a correlation as given in FIG. 1. That is, the water head loss rate is increased with increasing coagulant dosage. Floc coagulation effect is poor at an improper coagulant dosage and only small floc is formed. The small floc is trapped not at the surface parts of the filter medium layer, but rather at parts near the bottom of filter medium layer giving no substantial influence upon the water head loss rate. On the other hand, when the coagulant dosage is within a proper range, large floc is formed and trapped at the surface part of the filter medium layer, giving a significant influence upon the water head loss rate.

Figure 2:
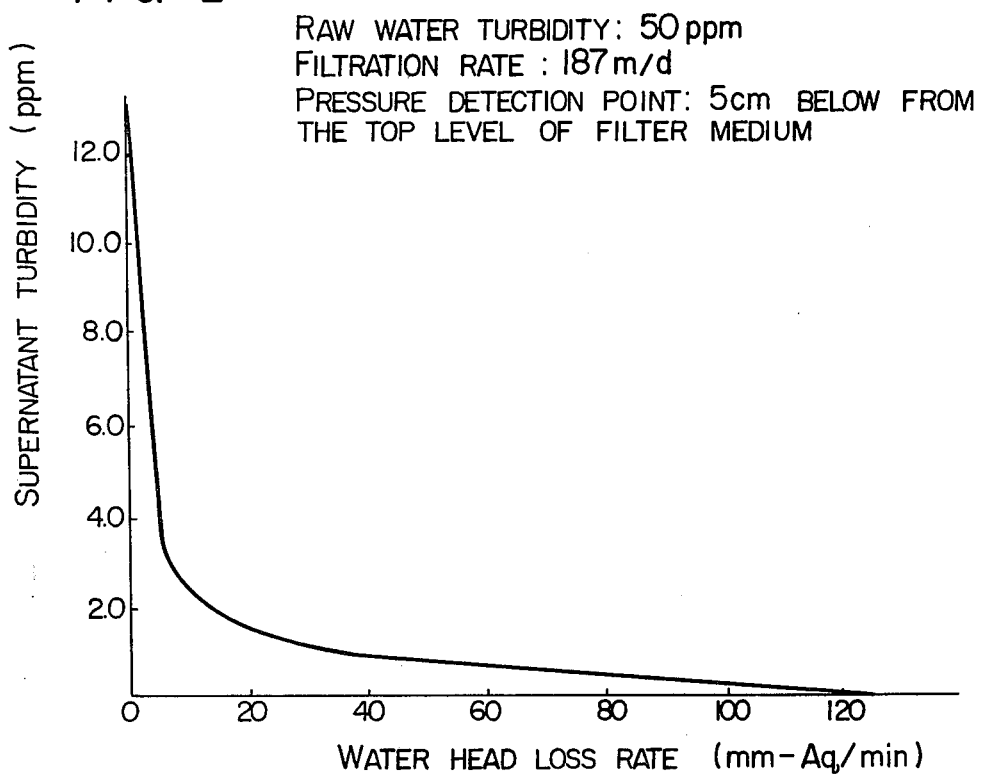
FIG. 2 is a diagram showing relations between water head loss rate as a rate of change in filtration pressure and supernatant water turbidity.

It was found that the turbidity of the supernatant water and the water head loss rate are in such a correlation as given in FIG. 2. The turbidity of supernatant water is decreased with increasing water head loss rate. It seems that the floc is larger at a higher water head loss rate, and consequently a rate of sedimentation of floc is higher, lowering the turbidity of supernatant water.

Figure 3:
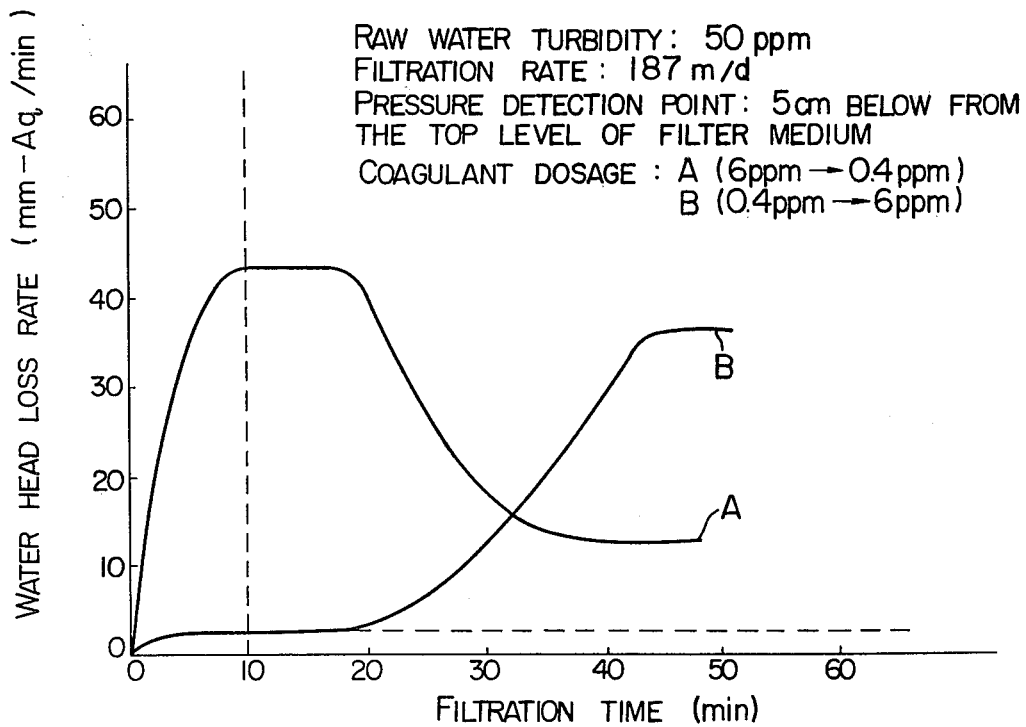
FIG. 3 is a diagram showing relations between filtration time and water head loss rate as a rate of change in filtration pressure, when a coagulant dosage is changed.

Changes in water head loss rate with time in transient states where a proper coagulant dosage of 6 ppm was changed to an improper (smaller) coagulant dosage of 0.4 ppm, and an improper (smaller) coagulant dosage of 0.4 ppm was changed to a proper coagulant dosage of 6 ppm, 10 minutes after the start of experiment, while keeping the turbidity of raw water at 50 ppm are shown in FIG. 3, where the former is plotted as curve A and the latter as curve B. When the proper coagulant dosage was changed to the improper coagulant dosage, the water head loss rate was decreased, about 8 minutes after changing the coagulant dosage. It seems that small floc formed after changing the coagulant dosage is trapped into the large floc trapped at the surface part of the filter medium layer at the proper coagulant dosage, slowing down an increase in the amount of trapped floc, and furthermore once the small floc is trapped in the large floc, the large floc already trapped is partly peeled off, replacing the large floc with the small floc and making the water head loss rate constant.

When the improper coagulant dosage was changed to the proper coagulant dosage, the water head loss rate was increased, 8 minutes after changing the coagulant dosage. It seems that, since the small floc formed at the improper dosage is trapped at the lower part of the filter medium layer, the water head loss rate is low, but the large floc formed after changing the coagulant dosage is trapped at the surface part of the filter medium layer, increasing the water head loss rate.

Figure 4:
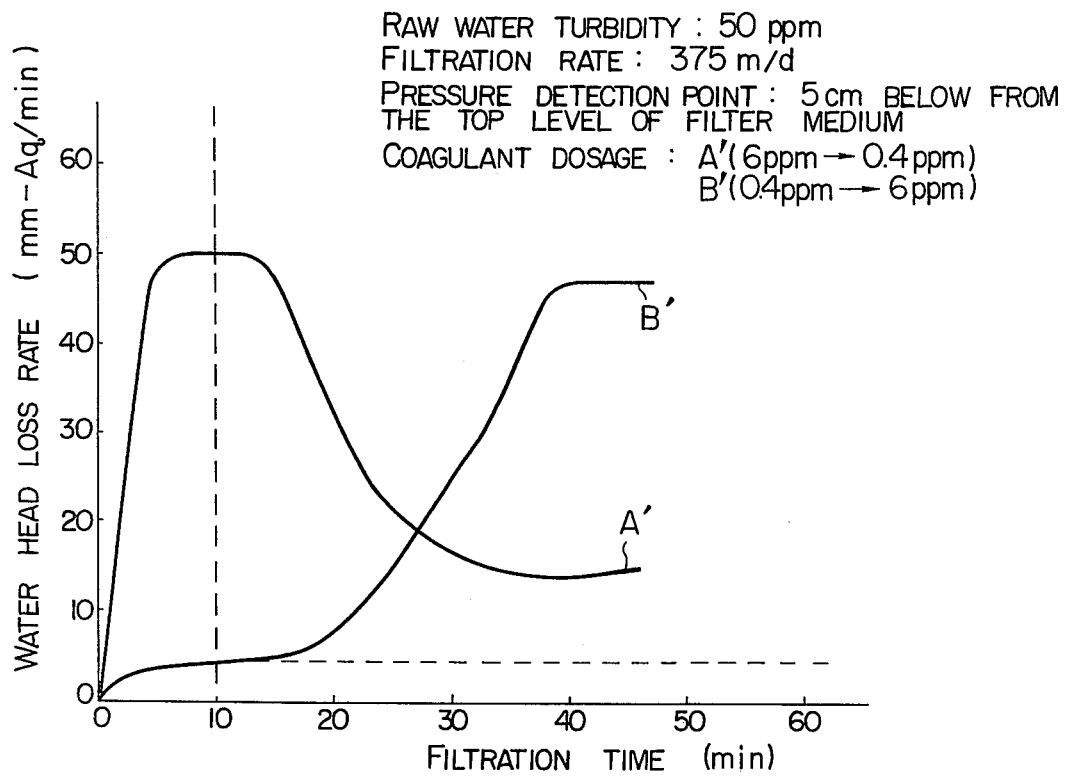
FIG. 4 is a diagram showing relations between filtration time and water head loss rate as a rate of change in filtration pressure, when a filtration rate and a coagulant dosage are changed.

Changes in water head loss rate with time determined under the same conditions as those in FIG. 3 except that a filtration rate was increased to 375 m/d from 187 m/d are shown in FIG. 4. The water head loss rate was changed, about 5 minutes after changing the coagulant dosage, and a response time of the water head loss rate was shortened, as compared with that in the case where the filtration rate was 187 m/d. It seems that a time of transport from the inlet of filter column to the filter medium layer is shortened by increasing the filtration rate.

Figure 5:
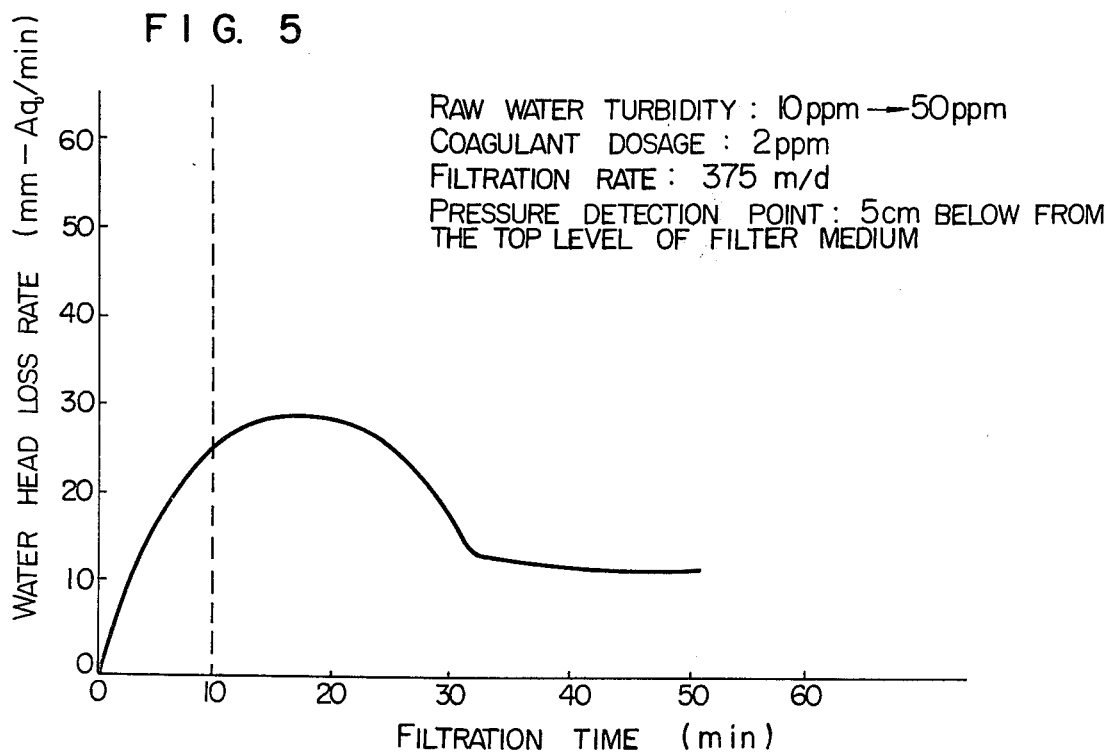
FIG. 5 is a diagram showing relations between filtration time and water head loss rate as a rate of change in filtration pressure, when a raw water turbidity is changed.

Changes in water head loss rate with time when a turbidity of raw water of 10 ppm with a proper coagulant dosage of 2 ppm was changed to a turbidity of raw water of 50 ppm, 10 minutes after the start of filtration are shown in FIG. 5. In that case, a similar tendency to those of curves A and A' in FIGS. 3 and 4, respectively, was observed, and it is seen that, even if the turbidity of raw water is increased, making the coagulant dosage improper, such improper coagulant dosage can be detected.

The present invention is based on the finding and results of said Experimental Example and provides an apparatus for detecting a coagulation effect by monitoring a change in a rate of change in filtration pressures in a filter column, for example, a change in water head loss rate to detect a coagulation effect of dosed coagulant as quickly as possible, and outputting an alarm signal, when detected improper, to a control system of coagulant dosage in a water purification process to adjust the improper coagulant dosage to a proper one, where the disadvantages of the prior art are eliminated.

An object of the present invention is to provide an apparatus for detecting a coagulation effect of dosed coagulant in a water purification plant, where a coagulant is dosed into raw water to form floc of suspended particles, and the water containing the floc is led to a sedimentation basin to carry out separation of the floc by sedimentation, thereby purifying the raw water, which comprises a filter means filled with a filter medium in layer and a filtration pressure detection point at a specific level in the filter medium layer, and a means for detecting an improper dosage of the coagulant in correlation to a change in a rate of change in filtration pressures, a portion of the water containing the floc and being led to the sedimentation basin being by-passed through the filter medium.

According to the present invention, a portion of the water containing the floc formed by dosing a coagulant into the raw water is by-passed through a filter column of the present apparatus, the filter column being filled in a filter medium in layer to a predetermined height, a filtration pressure is detected at the side of the filter column at a specific level of the filter medium layer at a specific time interval, the detected pressure is introduced into a means for computing a change in a rate of change in filtration pressures, for example, as a change in water head loss rate to detect the coagulation effect in correlation to the change in the rate of change in the filtration pressures.

The present invention is applicable not only to the detection of the coagulation effect of dosed coagulant, but also to assumption of the turbidity of supernatant effluent water from the sedimentation basin as described above, as well as determination of a period for discharging the sedimented floc from the sedimentation basin.

Other objects and features of the present invention will be apparent from the following description.

Figure 6:
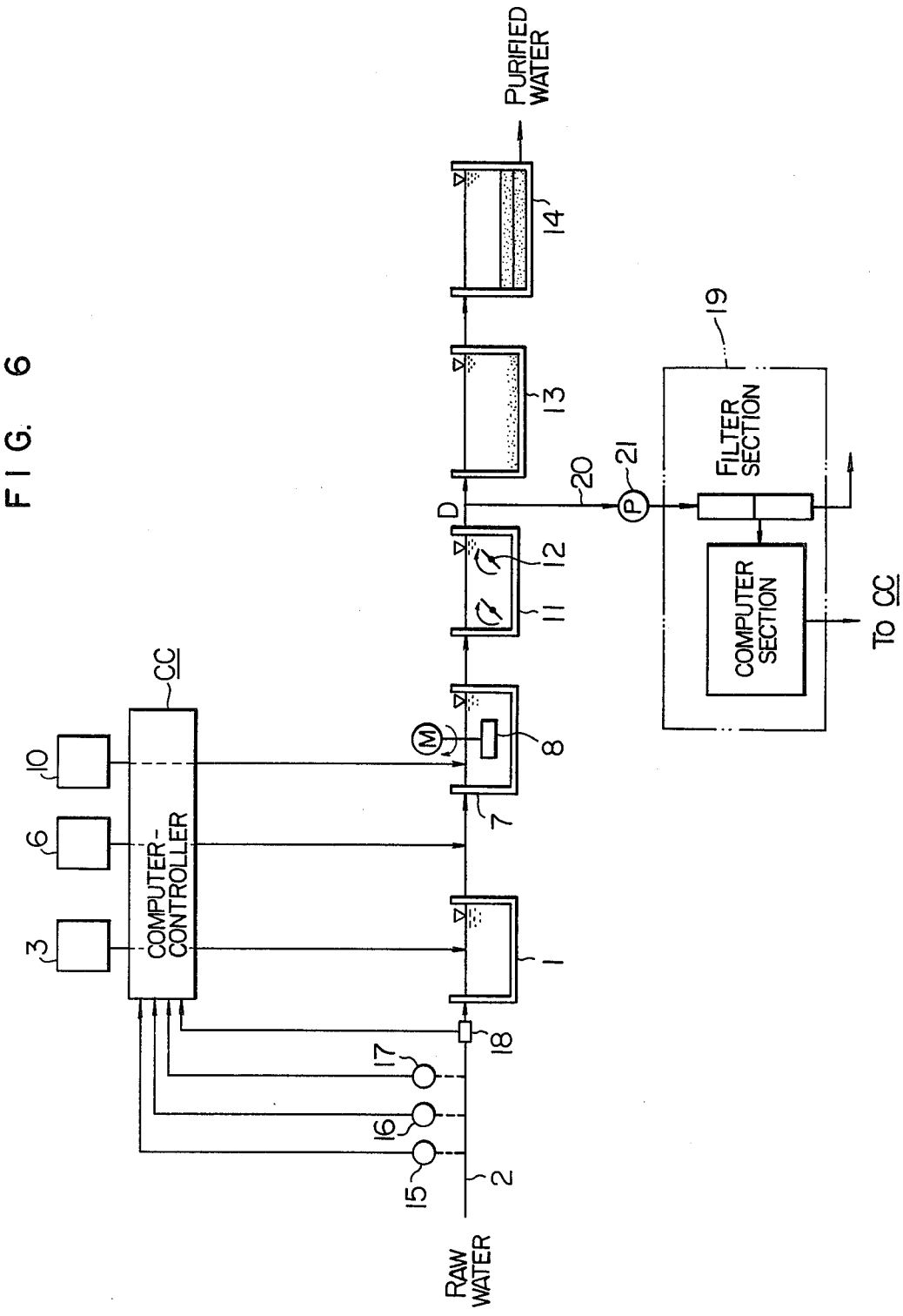
FIG. 6 is a flow diagram showing a water purification process in a water purification plant, to which the present apparatus for detecting a coagulation effect is applied.

In FIG. 6, numeral 1 is a raw water reservoir into which raw water is taken from river, pond, etc. by a pump (not shown in the drawing) and introduced through a conduit 2. In the raw water reservoir 1, a controlled amount of chlorine is dosed into the raw water from a chlorine tank 3 through a computer-controller system cc, and as a result, sterilization and oxidation of soluble iron, manganese, etc. are carried out by chlorine. A controlled amount of alkali is dosed into the water leaving the raw water reservoir 1 to adjust pH and alkalinity of the water. That is, a controlled amount of alkali such as caustic soda, etc. is dosed into the water from an alkali tank 6 through the computer-controller system cc, and the water is led to a mixing tank 7 where a controlled amount of a coagulant is dosed into the water from a coagulant tank 10 through the computer-controller system cc, while the water is rapidly stirred with a stirrer 8 driven by a motor. The coagulant is alum or polyaluminum chloride (PAC). As soon as the coagulant is dosed into the water while being rapidly stirred, suspended fine particles in the water are coagulant to form fine floc. The water containing the fine floc is led from the mixing tank 8 to a flocculation basin 11 where gentle stirring is carried out by paddles 12 to make the fine floc grow into large floc. The water containing the grown floc is then led from the flocculation basin 11 to a sedimentation basin 13 wherein the floc is separated from the water by sedimentation.

Supernatant effluent water from the sedimentation basin 13 is led to a filtration tank 14, where very fine particles, which have not been removed in the sedimentation basin 13, are removed by filtration through filter sand. The filtered water from the filtration tank 14 is then distributed to each consumption end by a pump (not shown in the drawing) through a purified water reservoir and a distribution reservoir (not shown in the drawing). Numeral 15 is a turbidity meter, numeral 16 a pH meter, and numeral 17 an alkalinity meter, each being provided in the conduit 2 to determine qualities of the raw water. Numeral 18 is a flow rate meter to measure a flow rate of the incoming raw water through the conduit 2. In the computer-controller system cc, dosages of chemicals such as chlorine, alkali and coagulant are calculated on the basis of the measurement results of the qualities and flow rate of the incoming raw water, and controlled amounts of chemicals are made to be dosed into the water.

The present apparatus for detecting a coagulation effect 19 is provided at an outlet side D of the flocculation basin 11 in such water purification process in the water purification plant as described above.

The apparatus 19 is connected to the outlet side D of the flocculation basin 11 through a conduit 20. A sampling pump 21 is provided in the conduit 20, and the water containing the grown floc is sampled from the outlet side D of the flocculation basin 11 by the pump 21 and led into the apparatus 19. In the embodiment, the water is sampled into the apparatus 19 by the sampling pump 21, but the pump 21 is not always necessary. For example, when the apparatus 19 is provided below the flocculation basin 11 and the water is sampled by falling through the conduit 20 by gravitation, the water can be introduced into the apparatus 19 without using the pump 21.

Figure 7:
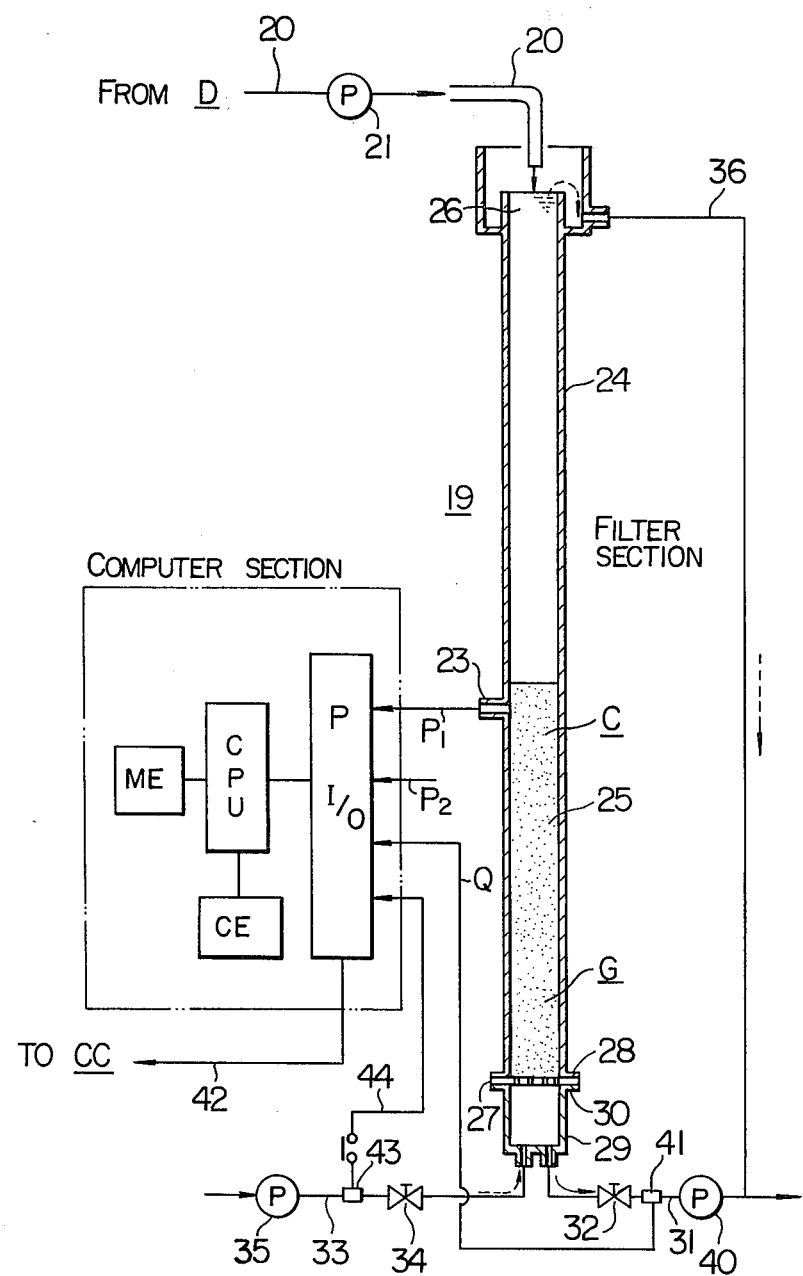
FIG. 7 is a structural view of one embodiment of the present apparatus for detecting a coagulation effect.

As one embodiment is shown in FIG. 7, the apparatus 19 comprises a filter section through which the introduced water can pass, and a computer section of making data processing based on a filtration pressure detected at a specific level of the filter section at a specific time interval together with other necessary additional data to monitor a rate of change in filtration pressure and detect an improper dosage of the coagulant in correlation thereto and output an alarm signal to the computer-controller system of chemical dosage.

The filter section comprises a cylindrical filter column 24 and a filter medium 25 filled in layer in the filter column 24. Top of the filter column 24 is open to the atmosphere, and the open top serves as an inlet 26 for the water fed from the outlet side D of the flocculation basin 11. A water collector plate with many small perforations 27 is provided at the bottom of the filter column 24, more particularly between a flange 28 at the bottom of the filter column 24 and a flange 30 of a water collector cylinder 29 to be jointed to the former flange through gaskets (not shown in the drawing). A discharge conduit 31, through which filtered water is discharged, is connected to the outlet side of the filter section, and a valve 32 is further provided in the discharge conduit 31. A water supply conduit 33 is also connected to the outlet side of the filter section besides the discharge conduit 31, and a valve 34 is also provided in the water supply conduit 33. Among the valves 32 and 34, the valve 32 is opened during the filtration through the filter column 24, while the other valve 34 is closed. At the back washing, that is, when the filter medium layer is clogged and washed with water, the valve 32 is closed among the valves 32 and 34, while the valve 34 is opened to supply washing water to the outlet side of the filter section by a water supply pump 35 provided in the water supply conduit 33 for back-washing. Opening or closing of the valves 32 and 34 is carried out manually or automatically, and the automatic opening or closing can be made by predetermined instructions from a timer (not shown in the drawing).

Back-washing time is usually about 10 minutes, though dependent upon the volume of filter medium. Back-washing is carried out when the pressure in the filter medium layer is considerably increased but before an appropriate filtration is difficult to carry out, and is usually carried out substantially once in 24 hours, but the number of back-washing can be changed, when required.

An overflow pipe 36 communicates the top part of the filter column 24 with the discharge conduit 31 at the outlet side of the valve 32.

A filtration detection point 23 is provided at the side of the filter column 24 to detect a filtration pressure at the surface part C of the filter medium layer, so that a change in filtration pressures during the filtration can be quickly and exactly detected.

The pressure detection point 23 detects a pressure in the surface part C of the filter medium layer at a specific time interval, and a detected pressure signal $P_1$ is introduced into a processs input-output unit PI/O of the computer section. That is, the computer section comprises a process input-output unit PI/O for inputting data signals or outputting an alarm signal in a specific form, a central processing unit CPU for computing based on the data signals, a memory unit ME for storing the data, and a control electronic unit CE for controlling the central processing unit, as shown in FIG. 7.

Besides said detected pressure signal $P_1$, a reference pressure signal $P_2$, a flow rate signal Q detected by a flow rate meter 41 provided in the discharge conduit 31 (a value for alarm standard is adjusted by Q), and a back-washing signal emitted from a back-washing signal emitter 43 provided in the water supply conduit 33 through a signal line 44 connected to the signal emitter 43 for instructing a back-washing signal in the case of back-washing, etc. are introduced into the process input-output unit PI/O. When these signals are introduced into the process input-output unit PI/O, the central computer unit CPU conducts data processing according to a processing flow chart shown as one example in FIG. 8 to monitor a change in a rate of change in filtration pressures and detect a coagulation effect in correlation to it, and output an alarm signal immediately, when detected improper, from the process input-output unit PI/O through an output line 42 to the computer-controller system cc shown in FIG. 6.

Figure 8:
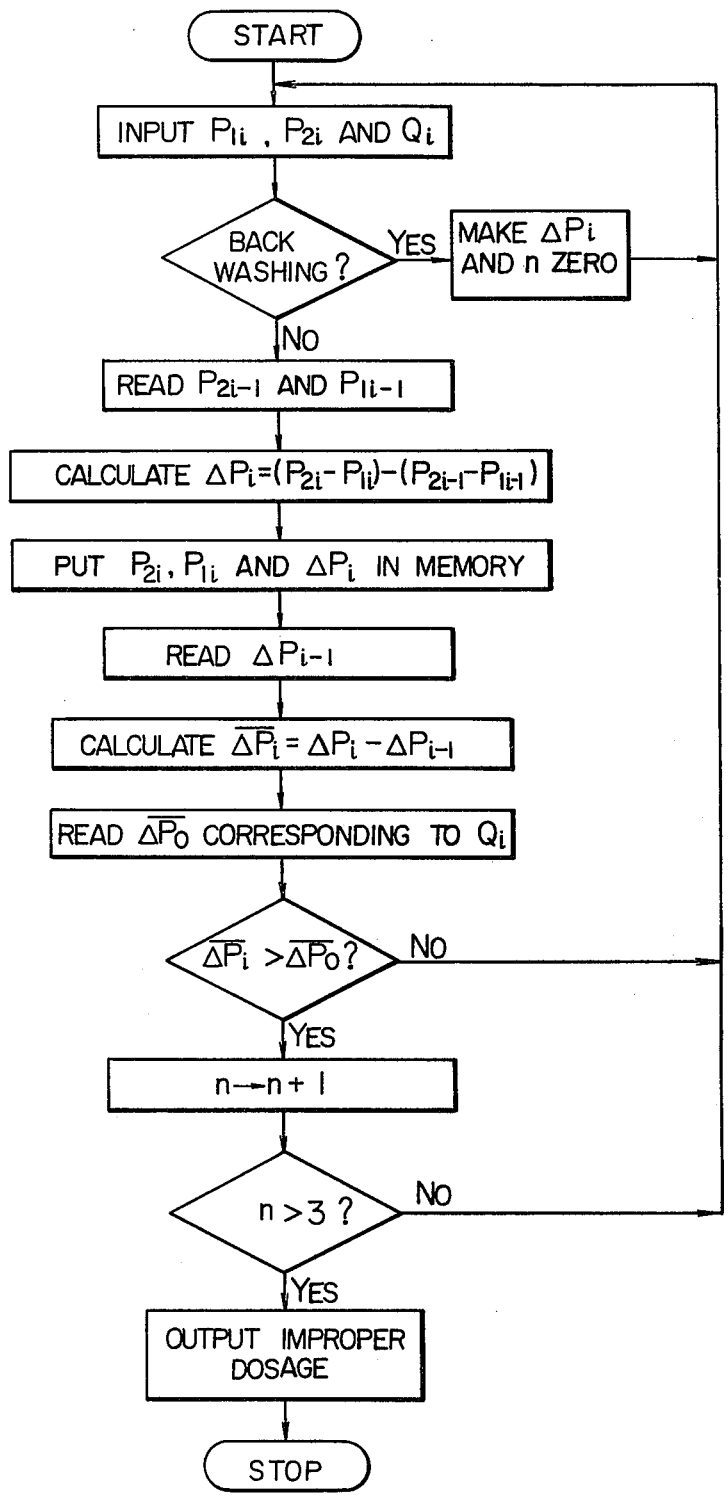
FIG. 8 is a processing flow chart of a computer section of the present apparatus for detecting a coagulation effect.
Figure 9:
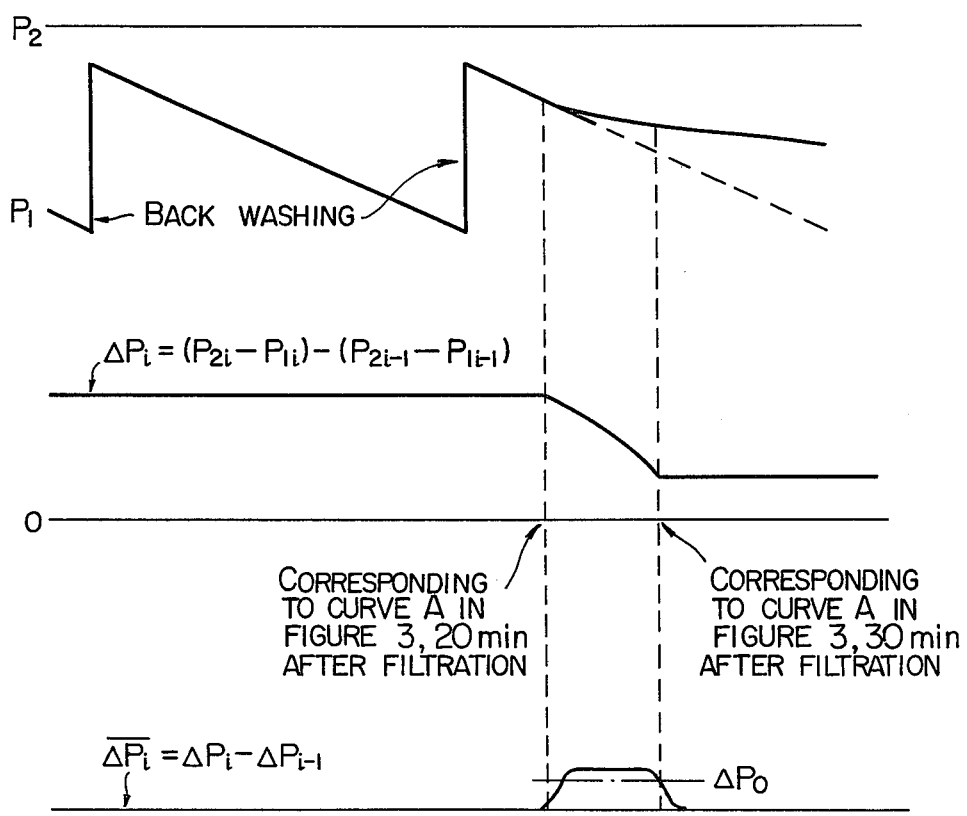
FIG. 9 is a wave-form diagram as the basis for the processing flow chart of FIG. 8.

In the processing flow chart shown in FIG. 8, detected filtration pressure $P_{1i}$ and reference pressure $P_{2i}$ at the i-th time interval are sampled and introduced into the computer section and a difference $\overline{\Delta P_i}$ in differences, $\Delta P_i$ at the i-th time interval and $\Delta P_{i-1}$ at the preceding (i−1)-th time interval is calculated on the basis of a wave-form diagram of FIG. 9 analyzing curve A of FIG. 3 of said Experimental Example and showing a model of a change in water head loss rate as a rate of change in the filtration pressure to detect a coagulation effect in correlation to the change in a rate of change in the filtration pressure. In this case, $\overline{\Delta P_o}$ corresponding to the flow rate $Q_i$ at the i-th time interval has been put into the memory unit ME in advance. In the processing flow chart, processing is carried out in three runs n at each time interval.

When the pressure detection point 23 is in a manometer mechanism, and the reference pressure $P_2$ is the atmospheric pressure, a difference in pressure is introduced into the computer section, and the difference in pressures at the i-th time interval and the (i−1)-th time interval directly corresponds to the difference $\overline{\Delta P_i}$ in the differences.

The flow rate Q in FIGS. 7 and 8 serves as a correction signal, because the water head loss rate is increased with increasing filtration rate, that is, with increasing flow rate Q, as described in reference to FIG. 4.

A method for detecting a coagulation effect according to the present apparatus will be described below.

As shown in FIG. 6, the water containing the floc, which leaves the flocculation basin after a series of chemical dosings have been carried out is sampled and continuously introduced into the present apparatus 19 through the conduit 20. The water containing the floc passes downwards through the filter medium layer filled in the filter column 24, as shown in FIG. 7, whereby the floc in the water is trapped by the filter medium 25 during the filtration. Filtered water is discharged from the bottom of the filter column 24 through the discharge conduit 31 connected thereto. During the filtration as described above, filtration pressure $P_1$ is periodically detected by the pressure detection point 23. A rate of change in filtration pressure $P_1$ is in correlation to the size of floc, that is, the coagulation effect, as described above, so that a higher rate of change in filtration pressure corresponds to a larger size of floc.

When chemicals, especially a coagulant properly dosed into raw water, and growth of floc proceeds smoothly, larger floc with a good settling ability can be formed. The large floc is trapped mainly at the surface part C of the filter medium layer and it takes much time for the large floc to reach the lower part of the filter medium layer. On the other hand, the small floc passes through the surface part C of the filter medium layer, though partially trapped there, but is mostly trapped at the lower part G of the filter medium layer. As described above, the filtration pressure is detected at the surface part C of the filter medium layer, and a higher rate of change in filtration pressure means larger floc, whereas a lower rate thereof means smaller floc.

The pressure $P_1$ detected by the pressure detection point 23 is introduced into the computer section shown in FIG. 7, and data-processed with other necessary date to detect a coagulation effect, as described above, and when the detected value shows an improper dosage of coagulant, an alarm signal is immediately fed back to the computer-controller system cc of chemical dosage as shown in FIG. 6 to adjust the coagulant dosage to a proper one.

The coagulation effect can be detected in this manner, but when the filter medium layer is clogged with the trapped floc with the filtration time, it is necessary to remove the trapped floc from the filter medium layer by back-washing. In that case, the introduction of sampled water into the filter section is discontinued, and the valve 32 provided in the discharge conduit 31 is closed, while the valve 34 provided in the water supply conduit 33 is opened, and at the same time the water supply pump 35 is operated to supply washing water into the filter column 24 through the water supply conduit 33. The floc trapped by the filter medium 25 is removed therefrom by back-washing with the washing water and is discharged together with the washing water from the top of the filter column 24 through the overflow pipe 36 in the dotted arrow direction in FIG. 7. In that case, the filter medium 25 is never discharged together with the washing water because of the larger specific gravity of the filter medium.

After the completion of the back-washing, the operation of the water supply pump 35 is discontinued, and the valve 34 is closed, while the valve 32 is opened. Then, the water containing the floc is again sampled and introduced into the filter section to detect the coagulation effect.

As described above, the present apparatus can detect the coagulation effect more exactly with a higher water head loss rate. Thus, it is necessary for this purpose to increase the filtration rate, as shown in FIG. 4. As a means of increasing the filtration rate, a suction pump 40 is provided in the discharge cnduit 31 at the outlet side of the filter section, so that the filtered water can be withdrawn by suction by means of the pump 40, whereby the water head loss rate is made higher than by gravitation. That is, a change in a rate of change in filtration pressure can be more exactly monitored by making the water head loss rate higher.

As described above, a coagulant dosage can be effectively carried out in the water purification process according to the present invention by by-passing a portion of the water containing the floc and flowing to the sedimentation basin through the filter column of the present apparatus and detecting a coagulation effect as quickly as possible in correlation to a change in the rate of change in filtration pressure. In the foregoing embodiment, the detection is discontinued during the back-washing of the filter medium, and when a pair of the present apparatuses are provided and one of the apparatuses is used for detection while the other is back-washed the detection can be continuously carried out without any interruption by the back-washing.

What is claimed is:

1. An apparatus for detecting a coagulation effect in a water purification plant, which comprises means for introducing a dose of a coagulant into raw water to form floc of turbidity-causing suspended particles, a flocculation basin for receiving the raw water containing said coagulant and for allowing growth of said floc, a sedimentation basin for separating the grown floc, means for leading the water containing the grown floc to said sedimentation basin to separate the grown floc by sedimentation, thereby purifying the raw water, means for by-passing a portion of the water containing the grown floc and being led to the sedimentation basin from said flocculation basin through a filter means, said filter means containing a layer of filter medium and having a filtration pressure detection point means at a specific level in the filter medium layer, means for monitoring a rate of change in filter pressure and for detecting an improper dosage of the coagulant into said raw water in correlation to a rate of change in filtration pressure within said filter medium layer and means for signaling an improper dosage of coagulant.

2. An apparatus for detecting a coagulation effect in a water purification plant, which comprises means for introducing a dose of a coagulant into raw water to form floc of turbidity-causing suspended particles, a flocculation basin for receiving the raw water containing said coagulant and for allowing growth of the floc, a sedimentation basin for separating the grown floc, means for leading the water containing the grown floc to the sedimentation basin to separate the grown floc by sedimentation, thereby purifying the raw water, means for by-passing a portion of the water containing the grown floc and being led to the sedimentation basin from said flocculation basin through a filter means, said filter means having a filter layer of filter medium contained therein and a filtration pressure detection point means at a specific level of the filter layer, a computer means for calculating and monitoring a change in a rate of change in filtration pressures detected by the filtration pressure detection point means at a specific time interval and for detecting a coagulation effect in correlation to said change and means for outputting an alarm signal when a detected dosage value is improper.

3. An apparatus according to claim 2, wherein said computer means includes reference pressure and flow rate input means to calculate the change in a rate of change in detected filtration pressures in comparison with the reference pressures with correction of a flow rate through the filter means at the specific time interval.

4. An apparatus according to claim 2, wherein the filter means comprises a cylindrical filter column having an inlet for the water at its top and an outlet at the bottom through a water collector plate with many small perforations.

5. An apparatus according to claim 4, wherein a backwashing line is connected to the bottom of the filter column, and an overflow line is provided to communicate the top of the filter column to a discharge line from the bottom of the filter column.

6. An apparatus according to claim 5, wherein an emitter means for generating back-washing signal is provided in a back-washing line.

7. An apparatus according to claim 5, wherein a flow rate meter and a suction pump are provided in the discharge line.

8. An apparatus according to claim 2, wherein the filtration pressure detection point means is provided at a side of the filter column and at a surface part of the filter medium layer.

9. An apparatus according to claim 2, wherein the computer means comprises a process input-output unit for inputting or outputting signals in specific forms, a central processing unit for computing based on data means, a memory unit for storing data, and a control electronic unit for controlling the central processing unit.

10. An apparatus according to claim 9, wherein said computer means includes means for introducing detected filtration pressures, reference pressures, an instruction of back-washing operation and flow rates detected in the flow rate meter in the discharge line as input signals into the process input-output unit of the computer section, means for computing the input signals to monitor a change in a rate of change in pressure and detect a coagulation effect in correlation thereto, and means for emitting an alarm signal to a control system for regulating the coagulant dosage when the coagulation effect is detected improper.

* * * * *